(12) United States Patent
Xie

(10) Patent No.: US 10,020,500 B2
(45) Date of Patent: Jul. 10, 2018

(54) CARBONIZED POLYANILINE-GRAFTED SILICON NANOPARTICLES ENCAPSULATED IN GRAPHENE SHEETS FOR LI-ION BATTERY ANODES

(71) Applicant: Indiana University Research and Technology Corporation, Indianapolis, IN (US)

(72) Inventor: Jian Xie, Carmel, IN (US)

(73) Assignee: Indiana University Research And Technology Corporation, Indianapolis, IN (US)

(*) Notice: Subject to any disclaimer, the term of this patent is extended or adjusted under 35 U.S.C. 154(b) by 48 days.

(21) Appl. No.: 15/125,640

(22) PCT Filed: Mar. 25, 2015

(86) PCT No.: PCT/US2015/022439
§ 371 (c)(1),
(2) Date: Sep. 13, 2016

(87) PCT Pub. No.: WO2015/148635
PCT Pub. Date: Oct. 1, 2015

(65) Prior Publication Data
US 2017/0005328 A1    Jan. 5, 2017

Related U.S. Application Data

(60) Provisional application No. 61/970,058, filed on Mar. 25, 2014.

(51) Int. Cl.
*H01M 4/36* (2006.01)
*H01M 4/04* (2006.01)
(Continued)

(52) U.S. Cl.
CPC ........ *H01M 4/366* (2013.01); *H01M 4/0471* (2013.01); *H01M 4/134* (2013.01);
(Continued)

(58) Field of Classification Search
CPC .... H01M 4/0471; H01M 4/386; H01M 4/587; H01M 4/134; H01M 4/366; H01M 10/0525
See application file for complete search history.

(56) References Cited

U.S. PATENT DOCUMENTS 5,674,642 A    10/1997  Le et al.
5,919,587 A    7/1999   Mukherjee et al.
(Continued)

FOREIGN PATENT DOCUMENTS

JP    2010129385 A    6/2010
WO    2009143405 A2   11/2009

OTHER PUBLICATIONS

Chemguide, Types of Catalysis, www.chemguide.co.uk/physical/catalysis/introduction.html (2004).
(Continued)

*Primary Examiner* — Daniel C McCracken
(74) *Attorney, Agent, or Firm* — C. John Brannon; Brannon Sowers & Cracraft PC

(57) ABSTRACT

A method for producing a graphene-composite material, including removing any oxide layer from each of a plurality of silicon nanoparticles, forming a polyaniline layer over each clean silicon nanoparticle, binding a graphene oxide sheet to the polyaniline layer of each particle, and carbonizing the polyaniline to yield a plurality of composite particles. Each composite particle has a graphene outer layer substantially encapsulating a silicon inner core.

15 Claims, 14 Drawing Sheets

(51) Int. Cl.
  *H01M 4/38*      (2006.01)
  *H01M 10/0525*   (2010.01)
  *H01M 4/587*     (2010.01)
  *H01M 4/134*     (2010.01)
  *H01M 4/62*      (2006.01)

(52) U.S. Cl.
  CPC .......... *H01M 4/386* (2013.01); *H01M 4/587* (2013.01); *H01M 4/625* (2013.01); *H01M 10/0525* (2013.01)

(56) References Cited

U.S. PATENT DOCUMENTS

| | | |
|---|---|---|
| 2002/0110737 A1 | 8/2002 | Park et al. |
| 2003/0098640 A1 | 5/2003 | Kishi et al. |
| 2003/0133867 A1 | 7/2003 | Lyons et al. |
| 2004/0009346 A1 | 1/2004 | Jang et al. |
| 2006/0165988 A1 | 7/2006 | Chiang et al. |
| 2007/0275305 A1 | 11/2007 | Omote |
| 2008/0160409 A1 | 7/2008 | Ishida et al. |
| 2009/0092747 A1 | 4/2009 | Zhamu et al. |
| 2009/0246625 A1 | 10/2009 | Lu |
| 2009/0271270 A1 | 10/2009 | Regmi et al. |
| 2010/0310934 A1 | 12/2010 | Yang et al. |
| 2010/0327847 A1 | 12/2010 | Leiber et al. |
| 2011/0033746 A1 | 2/2011 | Liu et al. |
| 2011/0177398 A1 | 7/2011 | Affinito et al. |
| 2012/0321953 A1 | 12/2012 | Chen et al. |
| 2013/0252101 A1* | 9/2013 | Zhou ................ H01M 4/1395 429/217 |

OTHER PUBLICATIONS

Si et al, Exfoliated Graphene Separated by Platinum Nanoparticles, 20 Chem. Mat;l. 6792-97 (2008).

Wang, Y. et al., Synthesis and Enhanced Intercalation Properties of Nanostructured Vanadium Oxides, Chemistry of Material, vol. 18, No. 11, Paragraphs [0085] and [0015-0016], (May 12, 2006), 2.

Sathiya, M., V2O5—Anchored Carbon Nanotubes for Enhanced Electrochemical Energy Storage, Sep. 2, 2011, Journal of the American Chemical Society, pp. 16291-16299.

* cited by examiner

CARBONIZED POLYANILINE-GRAFTED SILICON NANOPARTICLES ENCAPSULATED IN GRAPHENE SHEETS FOR LI-ION BATTERY ANODES

TECHNICAL FIELD

The novel technology relates generally to materials science, and, more particularly, to a high surface area graphene composite material.

BACKGROUND

Driven by the rapidly-growing field of hybrid and electric vehicles, there is an increasing demand for lithium-ion batteries (LIBs) characterized by high energy density, long cycle life, and low manufacturing cost. One of the most widely used anode materials in LIBs, graphite, possesses a theoretical specific capacity of only about 370 mAh/g, limiting the specific energy of LIBs. Recently, silicon (Si) has been regarded as one of the most promising anode materials for high-performance LIBs, due to its exceptionally high specific capacity (>4200 mAh/g). However, as an electrode material choice, SI suffers from several drawbacks, including a relatively low electrical conductivity, a volume change exceeding 300% upon lithium-ion insertion and/or deinsertion, and a rapid capacity fade. Perhaps chief among these issues, the dramatic volume change can result in the pulverization of the Si substrate, resulting in a loss of the electrical contact therewith and an unstable solid electrolyte interphase (SEI) layer. To overcome these disadvantages, various nanostructured Si materials have been developed, including Si nanoparticles, nanoporous Si, nanowires, core-shell structures, nanotubes, Si/carbon nanocomposites, and Si conformed in a conducting hydrogel. However, these materials still have some drawbacks, such as unsatisfactory cycling life, low capacity, low Coulombic efficiency, and complicated, expensive synthesis.

Recently, graphene/Si composite materials have been extensively studied by encapsulating Si nanoparticles within graphene nanosheets to create empty space to accommodate the volume change, buffer the mechanical stress, and improve the electrical conductivity. Graphene/Si composites may be prepared by drying an aqueous suspension of Si nanoparticles and graphene oxide (GO) and then thermally reducing the GO. The challenge of developing a uniform graphene/Si composite lies in the Si nanoparticles tending to aggregate in the aqueous solution, resulting in the inhomogeneous mixing of GO and Si. Creating an oxide layer on the Si nanoparticles and further functionalizing the Si nanoparticles to enhance their dispersion and the interaction between GO and Si can result in more uniform graphene/Si composites. Graphene/Si composites prepared using aminopropyltriethoxysilane-functionalized Si nanoparticles instead of conventional Si nanoparticles showed good performance as anodes in LIBs. However, the $SiO_2$ layer of a Si nanoparticle, acting as both an electrical insulator and a $Li^+$ diffusion barrier, has a negative impact on the electrochemical performance of Si-based electrodes yielding lower reversible capacity and decreased Coulombic efficiency. Thus, the use of a $SiO_2$ layer solves the dispersion problem but at a cost of performance and a hindrance to the preparation of uniform graphene-encapsulated Si composites without a $SiO_2$ passivation layer.

Thus, there remains a need for an improved graphene based silicon-containing electrolytic material. The present novel technology addresses this need.

SUMMARY

The present novel technology relates to a simple technique for the fabrication of graphene-encapsulated carbonized polyaniline-grafted Si nanoparticles. Si nanoparticles with a native oxide layer are HF-treated to remove the oxide layer such that a PANI layer may be formed over the Si nanoparticles via the surface-initiated polymerization of aniline on the surface of aniline-functionalized Si nanoparticles. Graphene oxide sheets are tightly bound to the PANI-grafted Si nanoparticles by a π-π interaction and an electrostatic attraction between the GO and the PANI. Finally, the PANI is carbonized, and this carbonized PANI layer tightly binds the graphene sheets and the Si nanoparticles together in the composite. The incorporation of graphene sheets enhances the conductivity of Si, increases the lithium-ion diffusion rate within the electrode material, and prevents the collapse and delamination of the Si nanoparticles from graphene. The resultant composite materials exhibit better cycling stability and Coulombic efficiency as anodes in lithium ion batteries, as compared to pure Si nanoparticles and physically mixed graphene/Si composites. The enhanced performance may arise from the strong interaction between the graphene sheets and the tightly bound carbon-coated Si nanoparticles as well as the absence of surface oxides.

DETAILED DESCRIPTION

Figure 1:
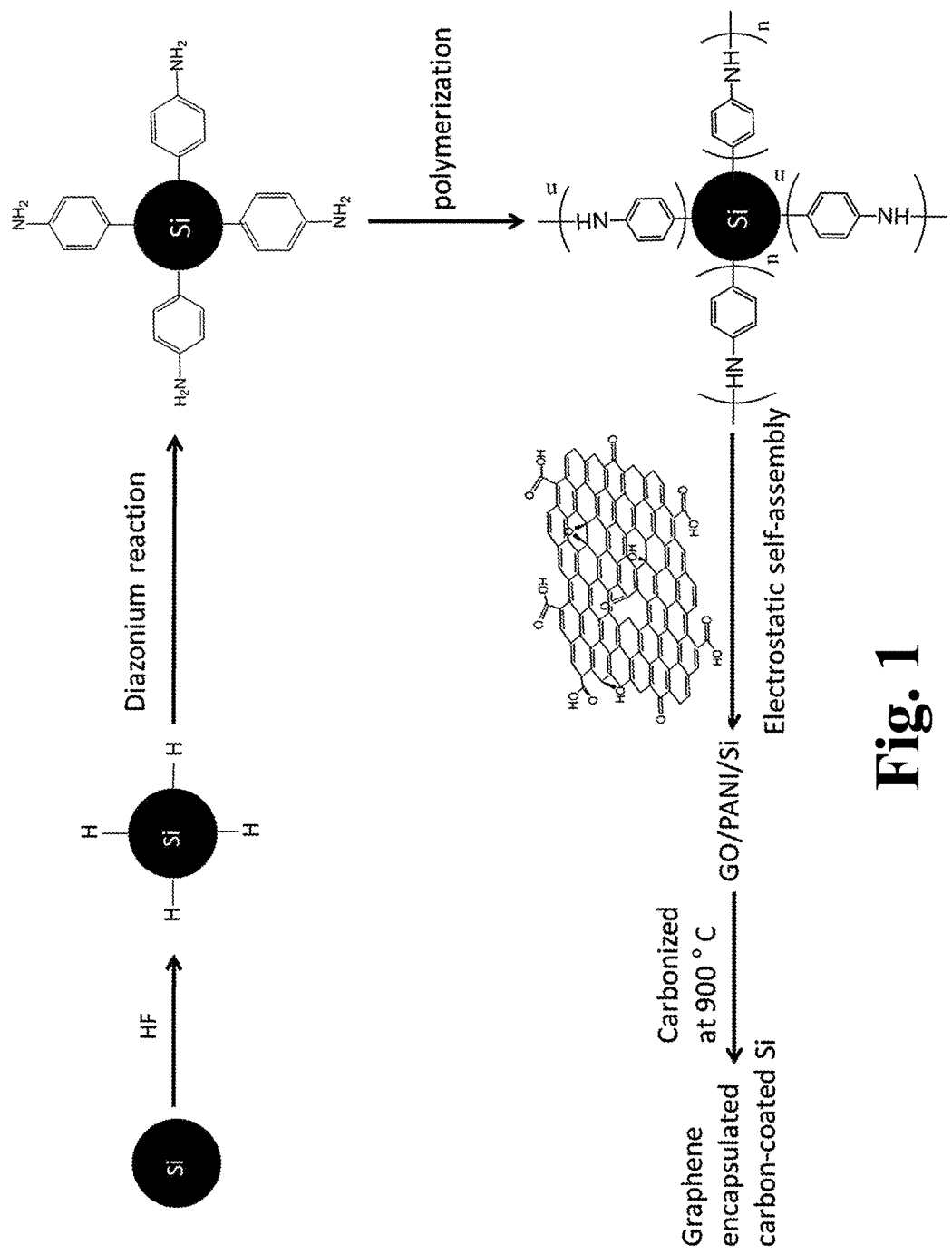
FIG. 1 schematically illustrates a method for the synthetic procedure of graphene/C/Si composites according to a first embodiment of the present novel technology.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

A first embodiment of the present novel technology relates to graphene sheets incorporating uniformly disbursed surface-modified and oxide-free Si nanoparticles, and a method for synthesizing the same. The Si nanoparticles are typically uniformly encapsulated within the graphene sheets to define a composite material. The composite materials are typically synthesized by the in-situ polymerization of aniline on aniline-functionalized Si nanoparticles, followed by the self-assembly with the Si nanoparticles utilizing the π-π interaction and an electrostatic attraction between graphene oxide (GO) and polyaniline (PANI)-coated Si nanoparticles, and, finally, their subsequent carbonization. While in this embodiment the silicon particles are functionalizing with aniline, other like organic functionalizing agents may be selected.

The incorporation of graphene sheets to encapsulate the Si nanoparticles typically provides high electronic conductivity, high mechanical strength, and large pore volume to accommodate the volume expansion of the Si. As a result, and compared to physically mixed graphene/Si composites and pure Si nanoparticles, the graphene-encapsulated carbonized PANI-coated Si composites exhibit enhanced electrochemical performance as anodes in lithium-ion batteries, in terms of cycling stability, rate performance, and Coulombic efficiency. The composites may deliver a reversible specific capacity of ~1500 mAh/g (total mass of Si and graphene) at a charge/discharge rate of 50 mA/g and more than 900 mAh/g at 3 A/g. Even after 300 cycles at 3 A/g, the composites have been observed to retain about 70% of their initial capacity.

FIG. 1 illustrates one method of uniformly encapsulating Si nanoparticles within graphene sheets through electrostatic self-assembly. Si nanoparticles are first treated, typically with 10% HF, to remove the surface oxide and create H-terminated Si surfaces. As H-terminated Si nanoparticles are very hydrophobic and tend to form a surface oxide layer when exposed to air, a good aqueous dispersion of Si nanoparticles is achieved by functionalizing the H-terminated Si nanoparticles, typically with aniline groups, such as via a diazonium reaction. A thin polyaniline layer is formed over the surface of each Si nanoparticle by the in-situ polymerization of aniline on aniline-terminated Si. A GO dispersion and the PANI-grafted Si dispersion are mixed to define a uniformly dispersed admixture. The thin PANI coating not only prevents the aggregation of Si nanoparticles, but also has a strong interaction with GO due to the π-π interaction and the electrostatic attraction between GO and PANI-coated Si nanoparticles, resulting in GO sheets tightly bound to the PANI-coated Si nanoparticles.

Next, the GO-wrapped PANI-coated Si nanoparticles are heated, typically to about 900° C., more typically in a nonoxidizing or reducing atmosphere, such as in Ar, to thermally reduce the GO into graphene and pyrolyze and at least partially carbonize the PANI to yield a final composite wherein Si nanoparticles are wrapped by a covalently-bonded carbon layer formed from the pyrolysis of the PANI and graphene sheets and tightly bound to the carbon layer. The additional thin carbon layer enhances the electric conductivity between the Si nanoparticles and the graphene sheets and helps to constrain the volume expansion of Si nanoparticles.

Figure 2A:
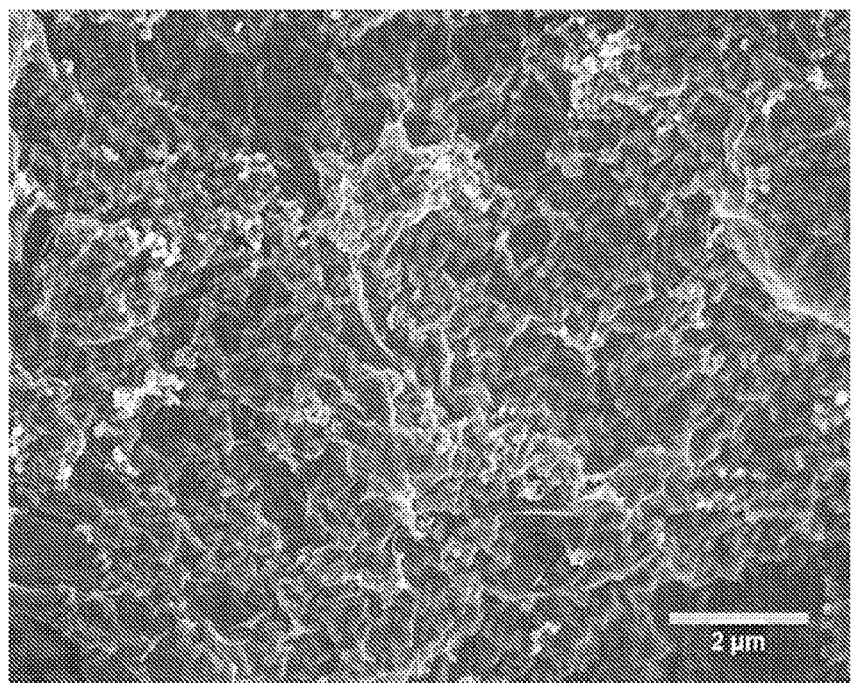
FIG. 2A is a first SEM photomicrograph of graphene-encapsulated carbonized PANI-coated Si according to a second embodiment of the present novel technology.
Figure 2B:
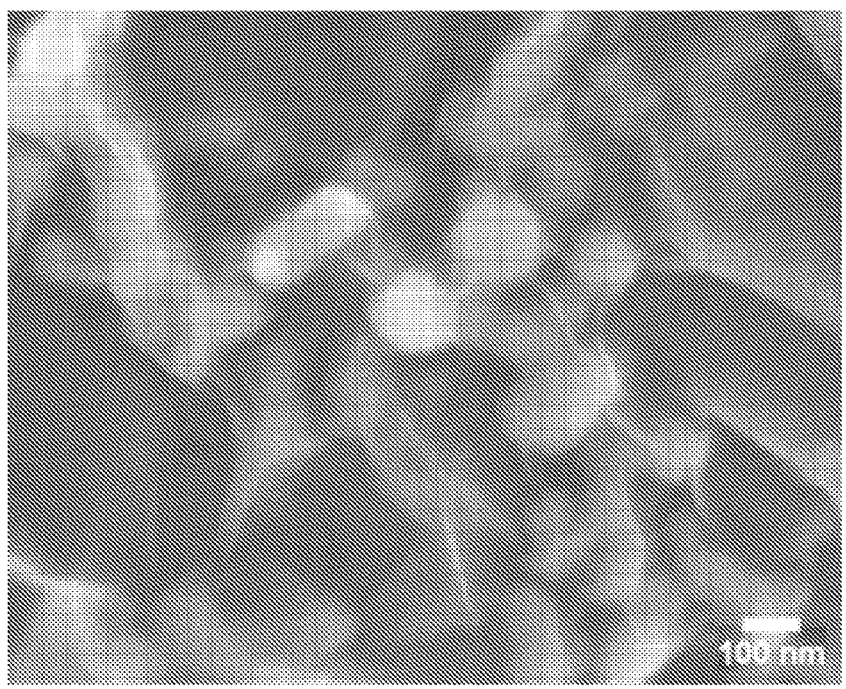
FIG. 2B is a second SEM photomicrograph of the graphene-encapsulated carbonized PANI-coated Si according of FIG. 2A
Figure 3A:
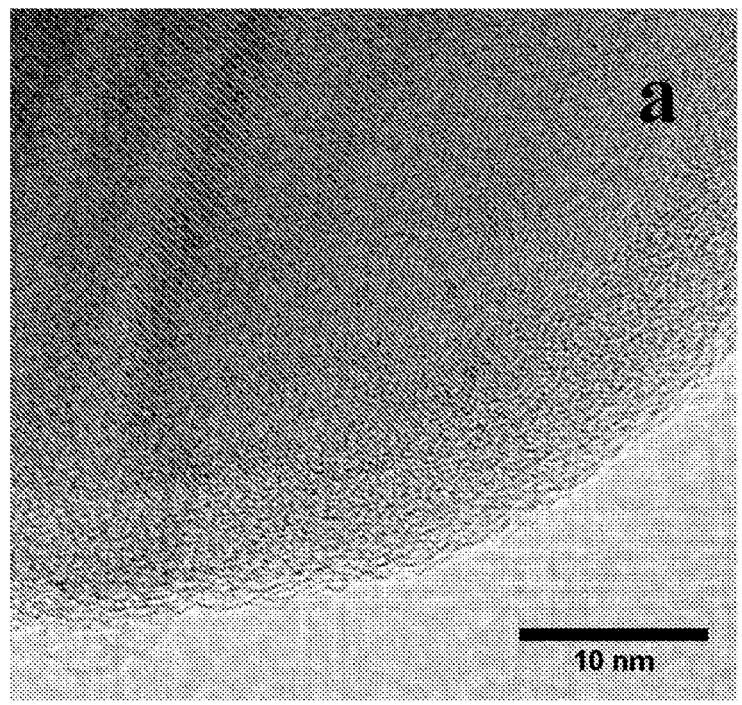
FIG. 3A is a first TEM image pristine Si nanoparticles according to the embodiment of FIG. 2A.
Figure 3B:
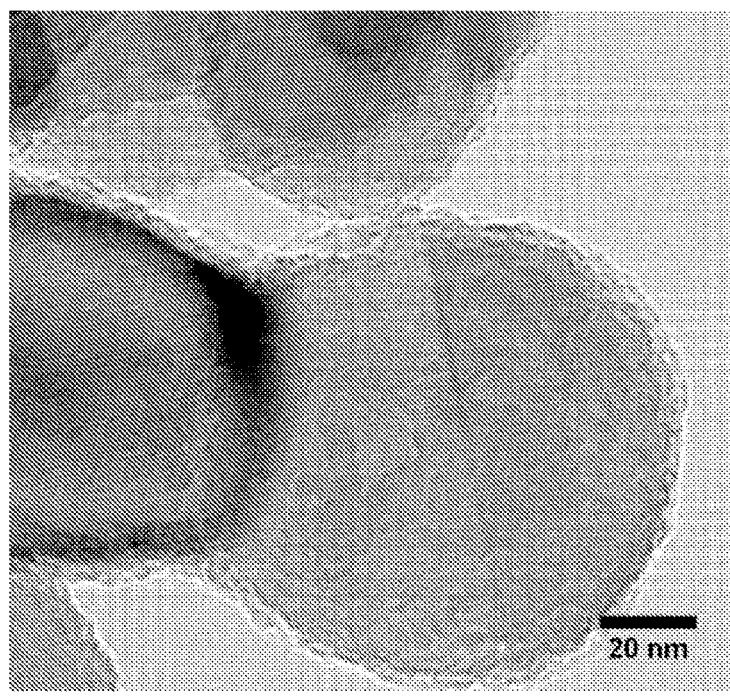
FIG. 3B is a second TEM image of a PANI-Si composite according to the embodiment of FIG. 2A.
Figure 3C:
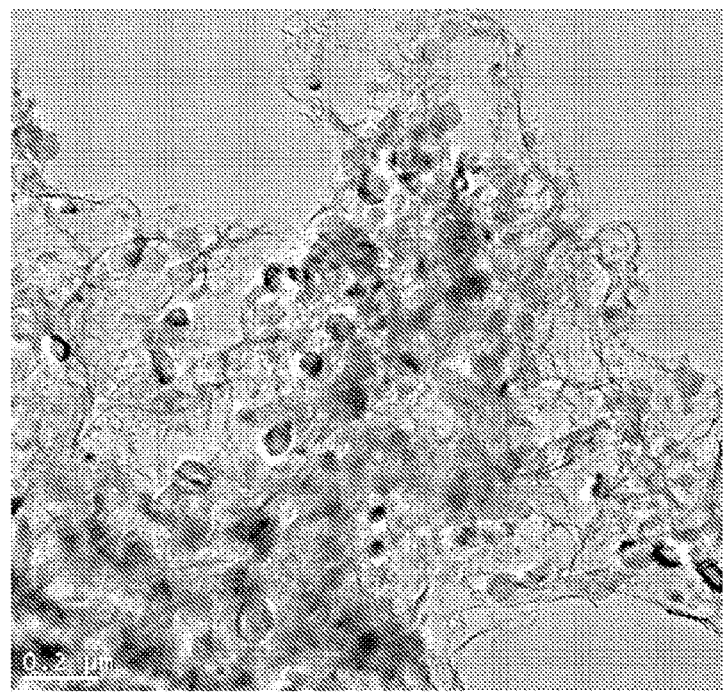
FIG. 3C is a third TEM image of graphene-encapsulated carbonized PANI-coated Si composites.
Figure 3D:
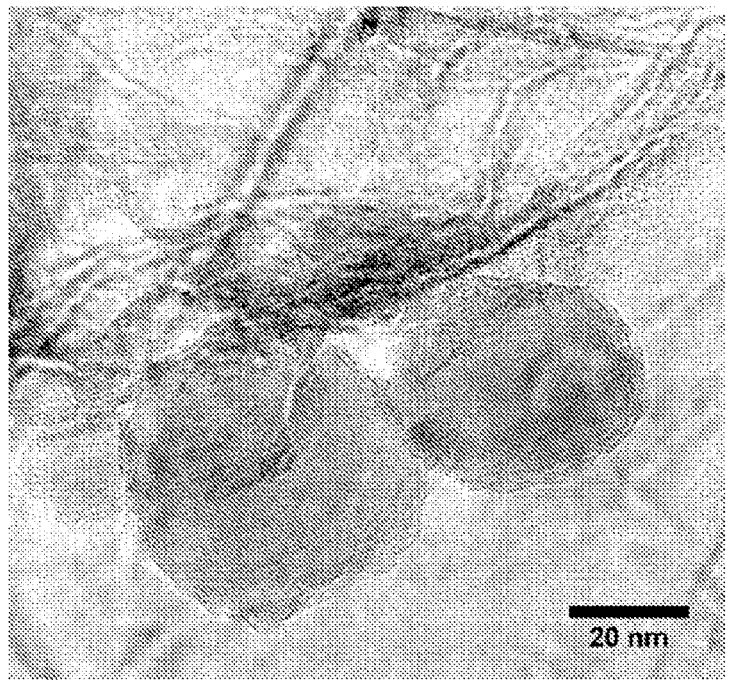
FIG. 3D is a fourth TEM image of graphene-encapsulated carbonized PANI-coated Si composites.

The morphology of partially or completely carbonized graphene-encapsulated PANI-coated Si is shown in FIG. 2 (SEM photomicrographs) and FIGS. 3A-3D (TEM images). The respective Si nanoparticles are substantially wrapped by graphene sheets, indicating the uniform electrostatic assembly of GO and PANI-coated Si nanoparticles. Pristine commercial Si nanoparticles typically have particle size less than too nm in diameter and a surface oxide layer about 5 nm thick (FIG. 3A). After the polymerization of aniline monomers on aniline-functionalized Si nanoparticles, a rough PANI coated layer with a thickness of several nm can be observed, as indicated by the arrow in FIG. 3B. FIG. 3C is a TEM image of graphene-encapsulated carbonized PANI-coated Si nanoparticles, obtained by the thermal treatment or calcining of the GO/PANI-coated Si at 900° C. in Ar to yield a carbonaceous outer layer around the silicon inner core. It is apparent that the Si nanoparticles are substantially wrapped in graphene sheets. The high resolution TEM image of FIG. 3D provides a close view of the composites. The Si nanoparticles are coated with a rough layer of carbonized PANI.

Figure 4A:
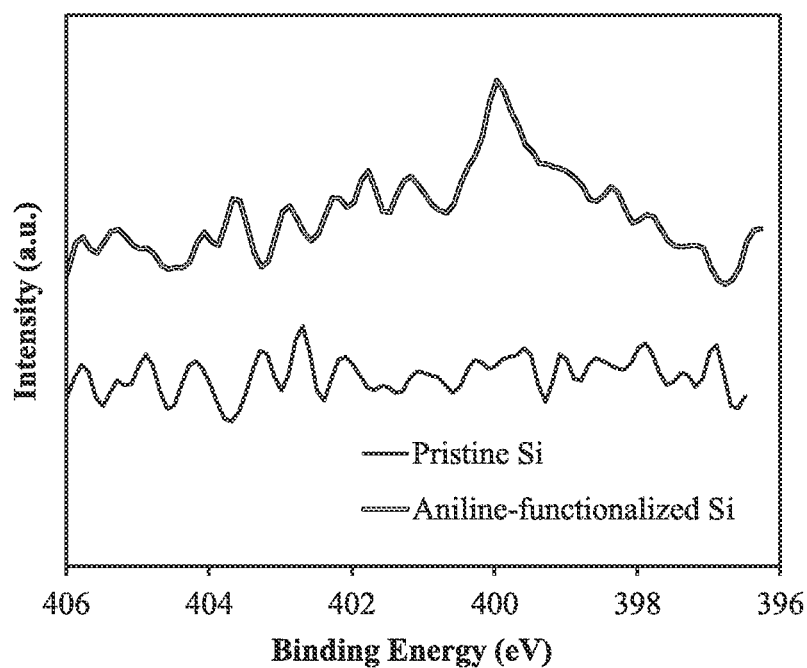
FIG. 4A graphically illustrates XPS spectra of pristine Si, aniline-functionalized Si, PANI-grafted Si, and graphene-encapsulated carbonized PANI-coated Si.
Figure 4B:
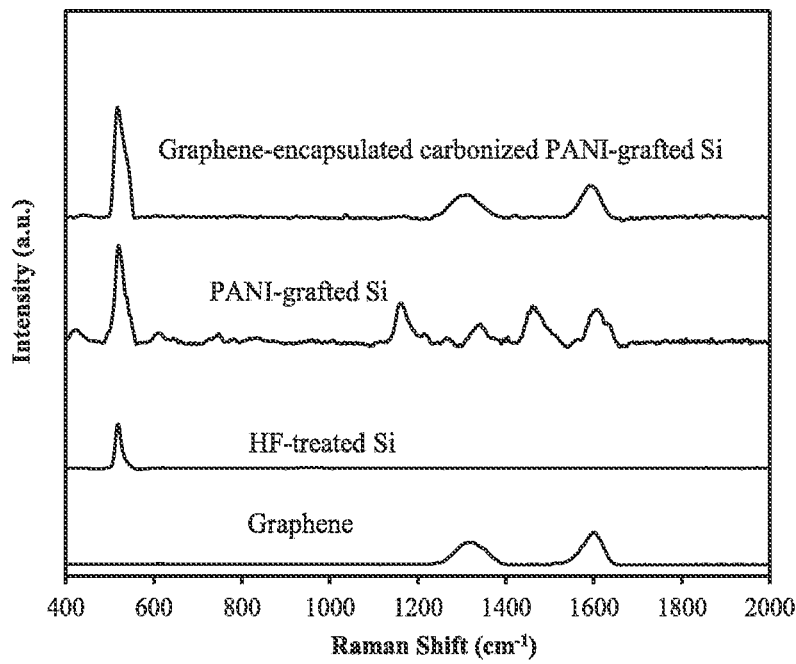
FIG. 4B graphically illustrates Raman spectra of pristine Si, aniline-functionalized Si, PANI-grafted Si, and graphene-encapsulated carbonized PANI-coated Si.

X-ray photoelectron spectroscopy (XPS) and Raman spectroscopy were likewise carried out on the composite materials. XPS spectra ($N_{1S}$) of pristine Si and aniline-functionalized Si are shown in FIG. 4A. Compared to the absence of nitrogen in pristine Si, a small peak around 400 eV is observed in the aniline-functionalized Si, indicating the successful grafting of aniline molecules on Si nanoparticles. As can be seen in FIG. 4B, the Raman spectrum of the Si nanoparticle displays a peak at around 520 cm$^{-1}$. Graphene exhibits two peaks, at around 1590 cm$^{-1}$ and about 1320 cm$^{-1}$, which are ascribed to sp$^2$ carbons (G band) and the disordered aromatic structure of the sp$^2$ carbons (D band). This disorder can be caused by surface defects, edges, or by the formation of sp³ bonds. The Raman spectrum of PANI-grafted Si shows the typical characteristic peaks of both Si and PANI (740, 1180, 1330, 1460, and 1592 cm$^{-1}$), indicating the successful grafting of PANI on the surface of the Si nanoparticles. In the graphene-encapsulated carbonized PANI-coated Si, the presence of graphene/carbon and Si are evidenced by three characteristic peaks around 520 (Si), 1320, and 1590 cm$^{-1}$. The PANI peak disappeared, suggesting that PANI has been pyrolyzed.

Figure 5A:
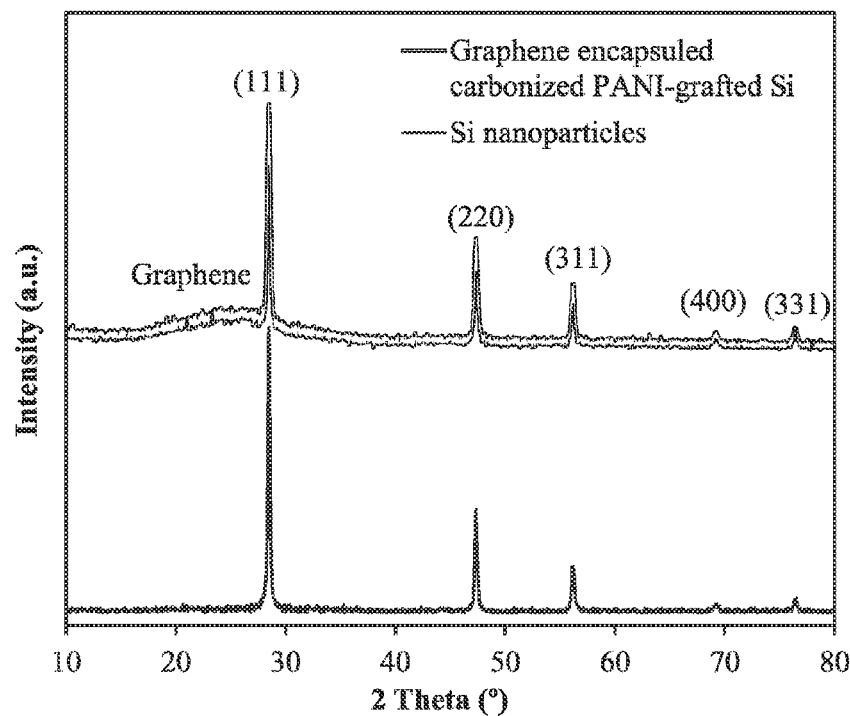
FIG. 5A-B graphically illustrate XRD patterns of Si and graphene-encapsulated carbonized PANI-coated Si and TGA curves of carbonized PANI-coated Si.
Figure 5B:
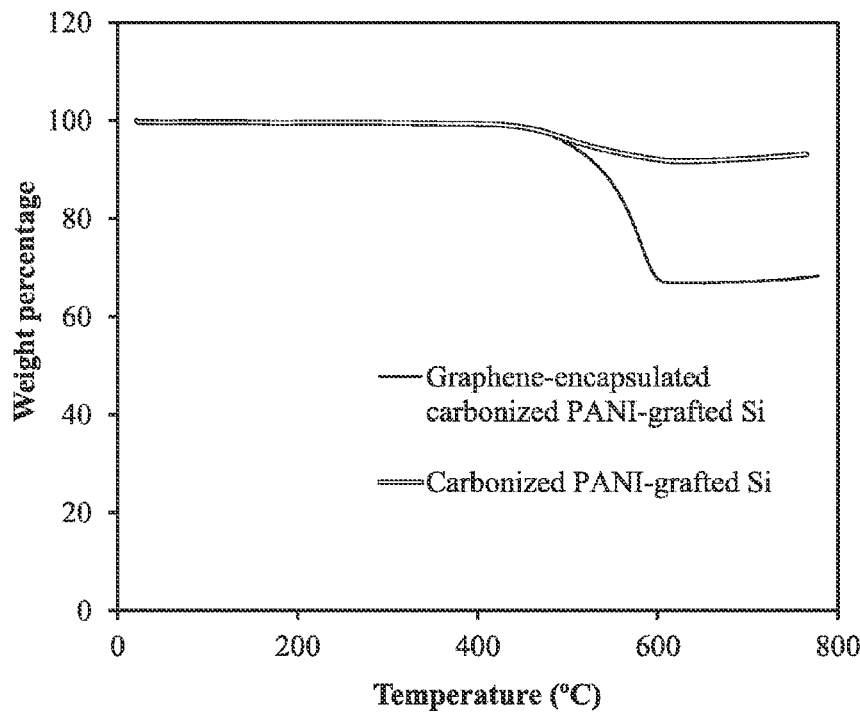

The X-ray diffraction (XRD) patterns of Si and graphene-encapsulated carbonized PANI-coated Si composites are shown in FIG. 5A. The graphene-encapsulated carbonized PANI-coated Si composites exhibited the characteristic peaks of Si and a broad band around 2θ=25° of (002) diffraction peaks of graphene, which suggests that the graphene sheets exist in the composite and that the Si nanoparticles are wrapped by graphene sheets in the carbonized PANI-coated Si composite.

FIG. 4B displays the thermal gravimetric analysis (TGA) curves of carbonized PANI-coated Si and graphene-encapsulated carbonized PANI-coated Si heated in air. A weight loss of about 34% was recorded at 600° C. due to the decomposition of the carbon and graphene in the final composites. Thus, the weight percentage of Si in the final composites is about 66%. The weight loss of the carbonized PANI-grafted Si sample at 600° C. is about 8%, suggesting that the carbon and graphene content in the composites were about 8% and 26%, respectively.

Figure 6A:
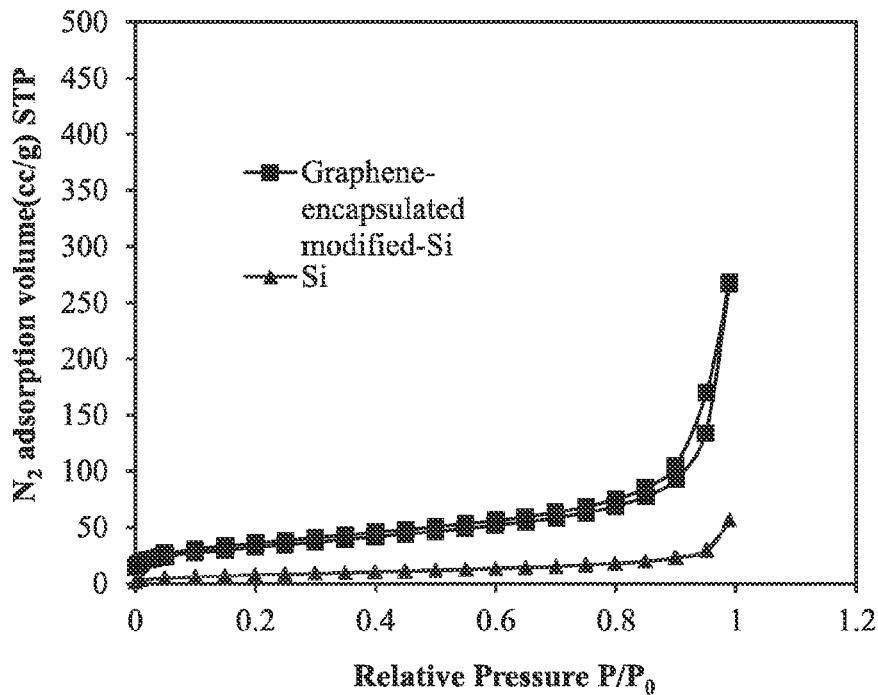
FIG. 6A graphically illustrates. $N_2$ adsorption-desorption isotherms for of Si and graphene-encapsulated carbonized PANI-grafted Si.
Figure 6B:
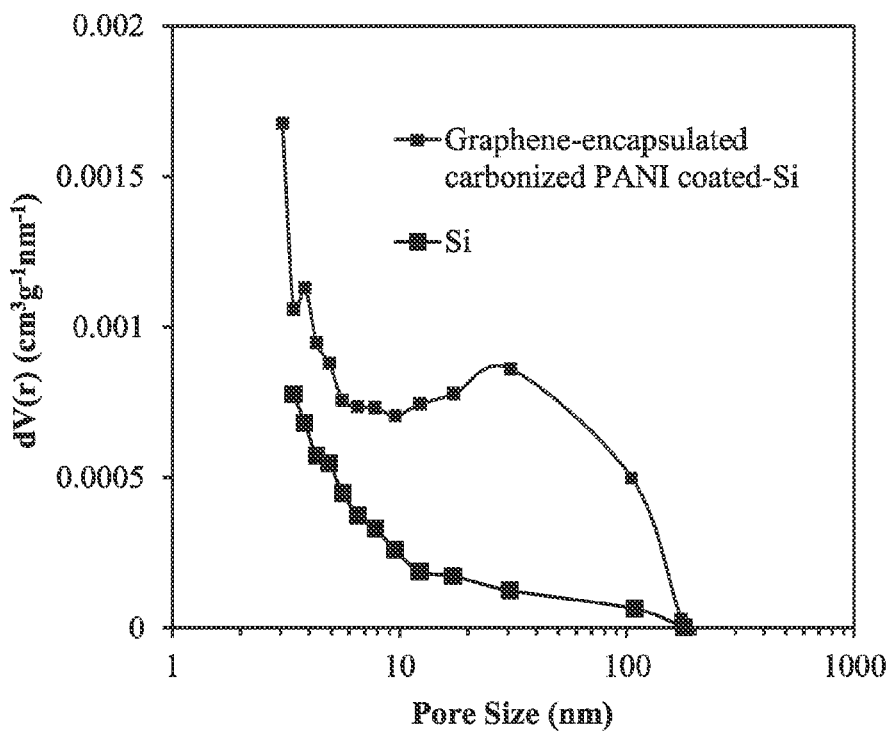
FIG. 6B graphically illustrates and BJH pore size distribution of Si and graphene-encapsulated carbonized PANI-grafted Si.

The porosity of the Si nanoparticles and the graphene-encapsulated carbonized PANI-coated Si composites were evaluated by $N_2$ adsorption-desorption isotherms at 77 K. The $N_2$ adsorption-desorption isotherms and the pore size distribution is shown in FIG. 6. The pure Si nanoparticles showed a BET surface area of about 28 m²/g and a pore volume of 0.087 cm³/g. The BET surface area and pore volume of graphene-encapsulated carbonized PANI-coated Si composites was 131 m²/g and 0.54 cm³/g, respectively. The increase in the surface area and the pore volume of the composites is expected to facilitate the Li$^+$ ion transport and accommodate the volume expansion of Si nanoparticles during charging/discharging.

Figure 7A:
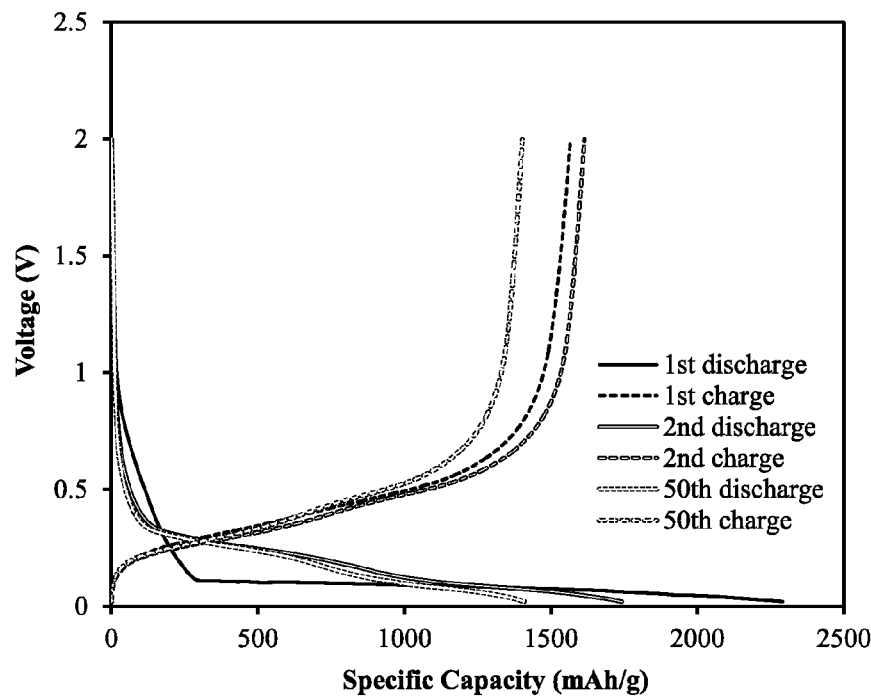
FIG. 7A graphically illustrates the charge/discharge curves of the graphene-encapsulated carbonized PANI-coated Si.
Figure 7B:
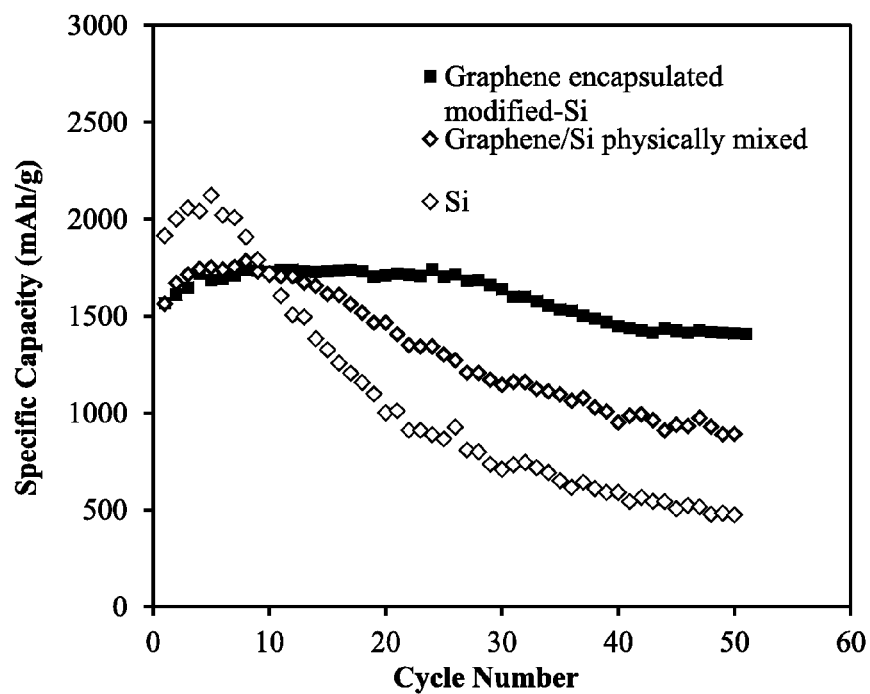
FIG. 7B graphically illustrates capacity retention curves of the graphene-encapsulated carbonized PANI-coated Si.

The electrochemical performance of the composites and the pristine Si nanoparticles were evaluated using Galvanostatic charge/discharge cycles between 2-0.01 V. FIG. 7A shows the Galvanostatic charge/discharge curves (1st, 2nd, and 50th cycles) of graphene-encapsulated carbonized PANI-coated Si composites. The specific capacity is calculated based on the total mass of the active material (graphene/C and Si), and the cycling stability is shown in FIG. 7B. The charge capacity of the pristine Si electrode rapidly decreased to less than 500 mAh/g after 50 cycles at a current density of 200 mA/g, due to the pulverization of the Si particles. In comparison, the graphene-encapsulated carbonized PANI-coated Si composites still retain a specific charge capacity of about 1400 mAh/g. The improved stability in the composite likely arises from the Si nanoparticles in the composite being well-wrapped by graphene sheets, with the carbonized PANI layer acting as an adhesive layer to strongly bind the graphene and Si nanoparticles. The carbonized PANI layer provides improved electrical conductivity between the Si nanoparticles and the graphene sheets as well as throughout the electrode layer. In addition, the graphene sheets and the carbonized PANI-covered Si nanoparticles provide a mechanically strong structure to buffer the volume expansion and prevent the aggregation of Si nanoparticles during cycling.

Figure 7C:
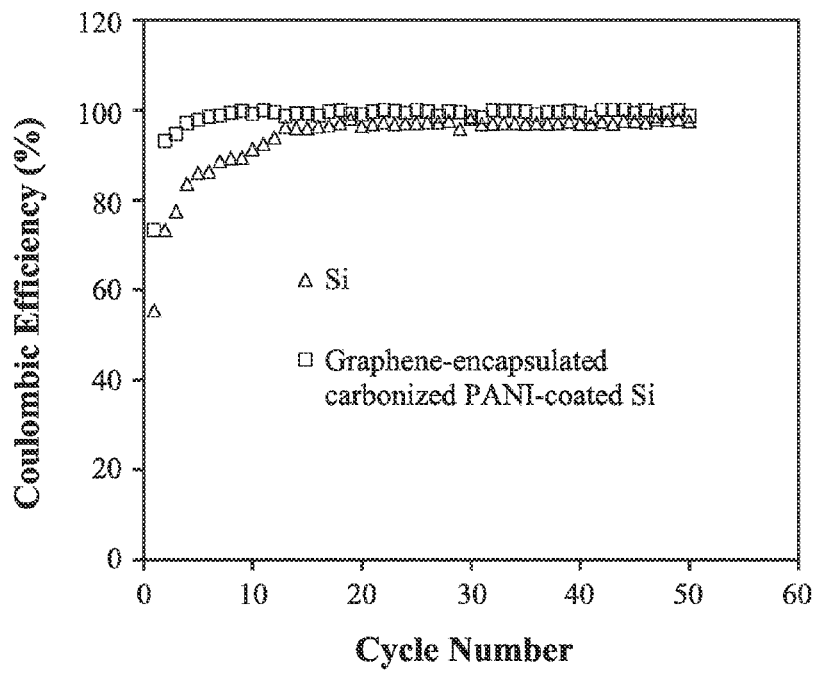
FIG. 7C graphically illustrates Coulombic efficiency of the Si, graphene/Si mixture, and the graphene-encapsulated carbonized PANI-coated Si at a constant current density of 100 mA/g.

Graphene was tested as the anode in an LIB. The initial capacity of graphene is about 800 mAh/g but quickly decays to below 200 mAh/g. Extracting the capacity contribution from graphene, the reversible capacity of the Si in composites can be estimated to be around 2000 mAh/g. The Coulombic efficiency was obtained by dividing the specific charge capacity by the specific discharge capacity. For the pristine Si, the first-cycle Coulombic efficiency was only 55% due to the initial SEI layer formation and irreversible lithium reaction with the surface oxides on the Si nanoparticles. For the graphene-encapsulated carbonized PANI-coated Si composites, the Coulombic efficiency for the first cycle was 73.2% (FIG. 7C), which is comparable to the literature-reported values of MCMB anodes. This is likely due to the irreversible lithium reaction with the residual functional groups on the graphene during the initial SET layer formation. The Coulombic efficiency of the composites increased rapidly and remained above 99% during the following cycling tests, while the Coulombic efficiency of the pure Si nanoparticles increased slowly and stabilized around 98%. The lower Coulombic efficiency of pure Si is probably caused by the unstable SEI layer and the propagation of microdefects and electrically isolated areas within the anode, a result of the pulverization of the Si nanoparticle during cycling. The high Coulombic efficiency of graphene-encapsulated carbonized PANI-coated Si composites is indicative of the excellent stability of the SEI layer, resulting from the uniform graphene wrapping of the Si nanoparticles and the aid of the surface carbon layer (from the PANI layer carbonization).

Figure 7D:
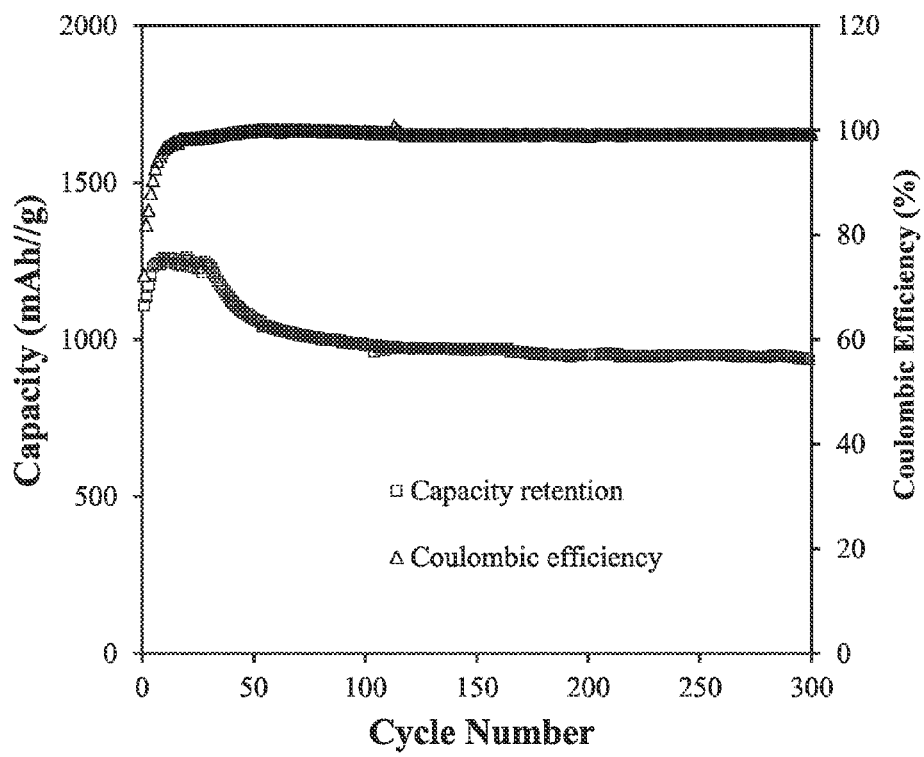
FIG. 7D graphically illustrates capacity retention curves of the graphene-encapsulated carbonized PANI-coated Si at 3 A/g.

When Si nanoparticles were physically mixed with the graphene sheets, this material showed a similar cycle life behavior to that of the first 10 cycles of the graphene-encapsulated carbonized PANI-coated Si composites, but then decayed rapidly as the pure Si nanoparticles do. This further demonstrates the effects of the carbon layer on the Si nanoparticles (from the carbonization of the PANI layer on the Si nanoparticles) in the graphene-encapsulated carbonized PANI-coated Si composite. The physically mixed graphene sheets do not tightly bind the Si nanoparticles due to less of an interaction between the graphene sheets and the Si nanoparticles; hence, they can improve the electric conductivity to a degree that is much better than that of pure Si nanoparticles only in the first 10 cycles; however, without the carbon layer (formed from the carbonization of the PANI layer) on the Si nanoparticles, these graphene sheets can't bind very tightly to the Si nanoparticles, as is the case in the graphene-encapsulated carbonized PANI-coated Si composites; hence, the electronic conductivity starts to decline after the 10$^{th}$ cycle due to the pulverization of the Si nanoparticles and, consequently, the cycle life performance. It is noteworthy that the existence of graphene sheets in the Si nanoparticles, even if physically mixed, still improves the electric conductivity, resulting in a better cycle life performance than that of the pure Si nanoparticles, but a worse cycle life performance than that of the graphene-encapsulated carbonized PANI-coated Si composites. The graphene-encapsulated carbonized PANI-coated Si composites also exhibited excellent cycling performance at a high current of 3 A/g, as shown in FIG. 7D.

Figure 8A:
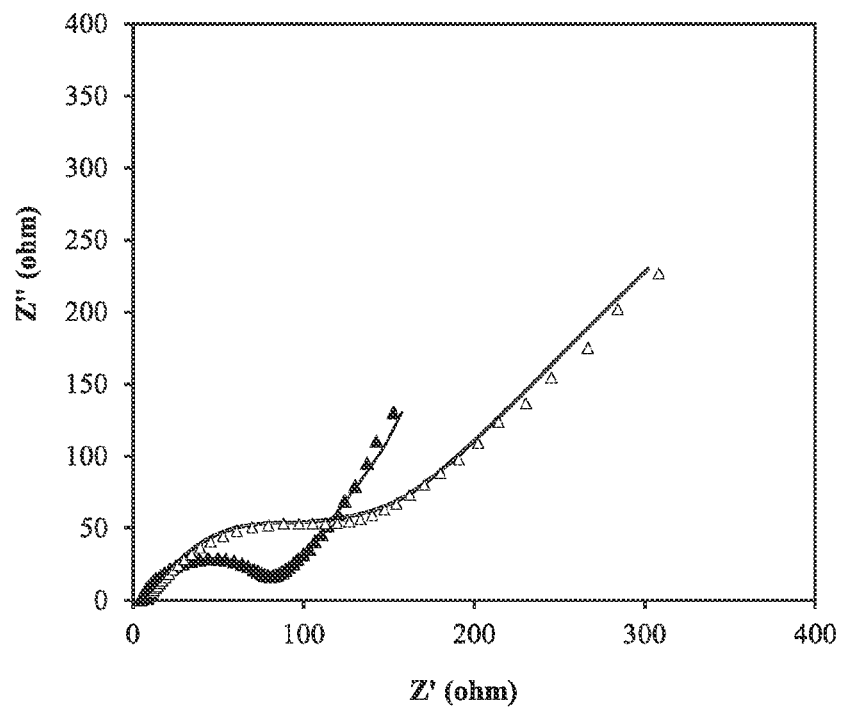
FIG. 8A-B graphically illustrate EIS spectroscopy curves for Si graphene-encapsulated carbonized PANI-coated Si before and after 100 cycles.
Figure 8B:
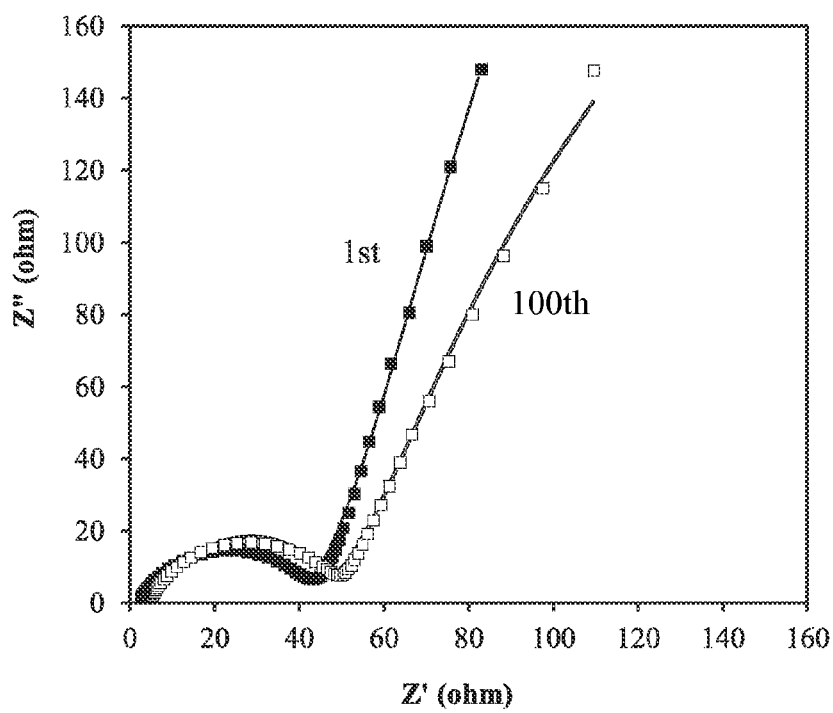
Figure 9A:
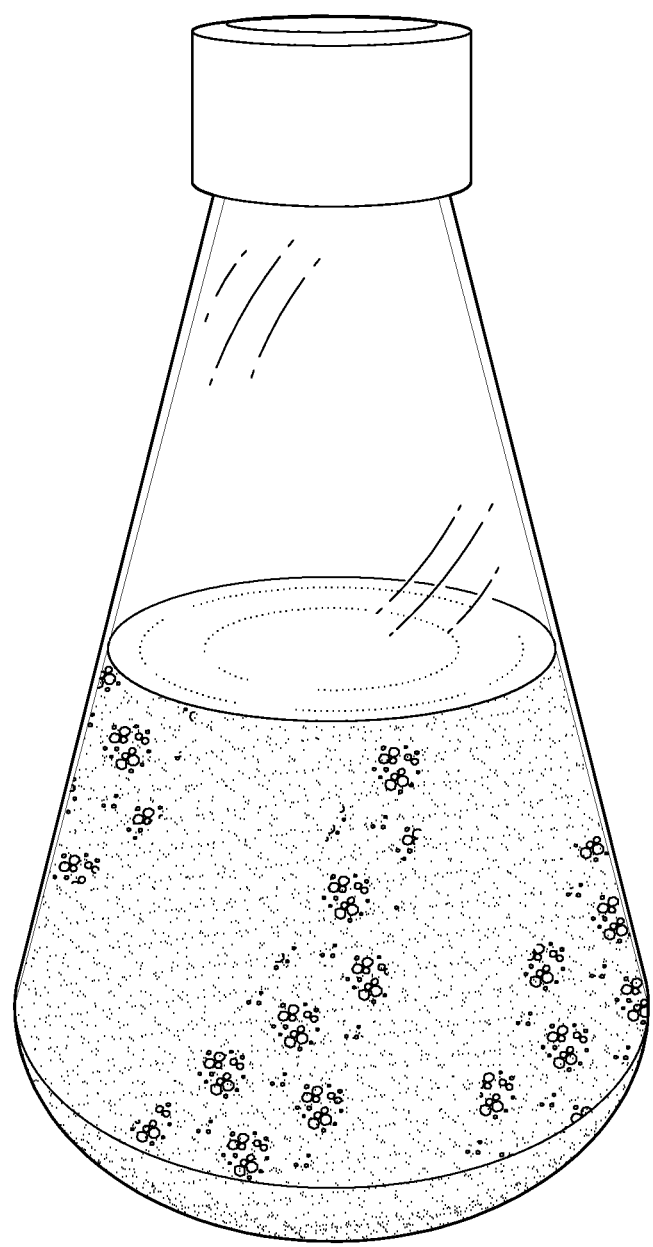
FIG. 9A graphically demonstrates an aqueous dispersion of HF-etched Si nanoparticles (extremely hydrophobic).
Figure 9B:
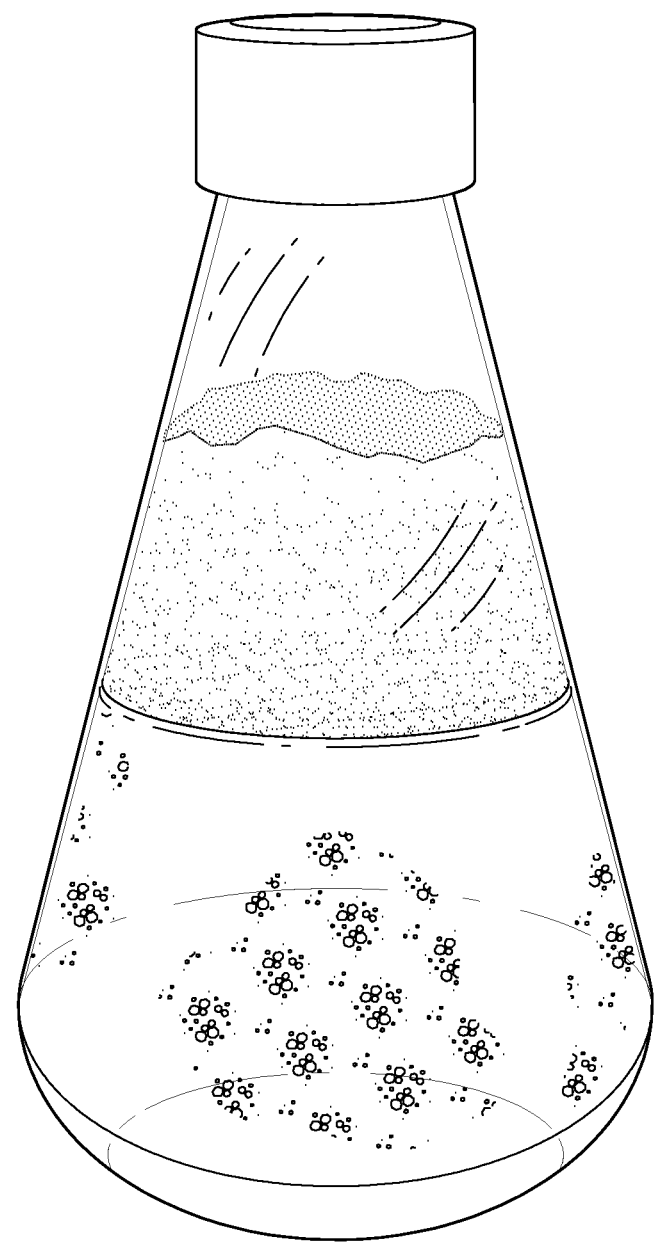
FIG. 9B graphically illustrates an aqueous dispersion of aniline-functionalized Si nanoparticles (much more hydrophilic than oxide-free Si).
Figure 10A:
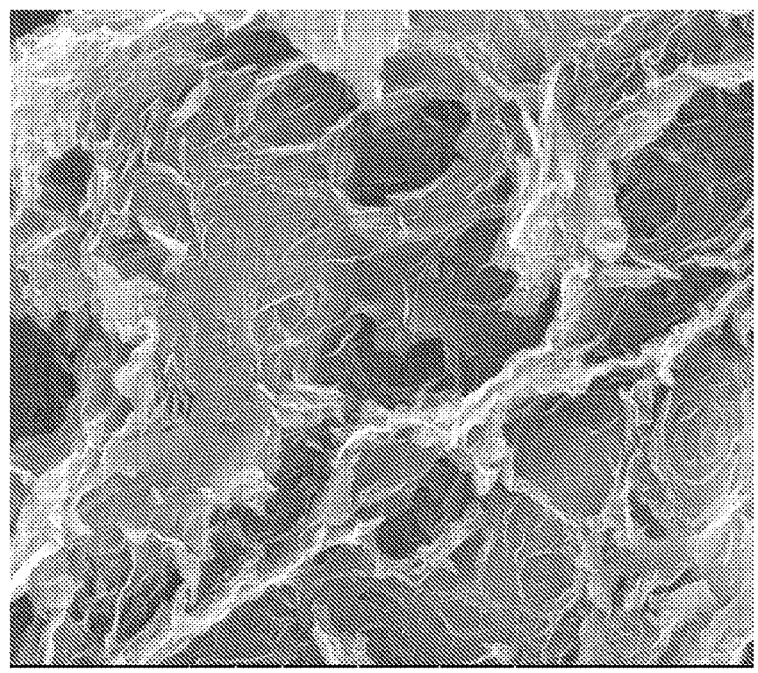
FIG. 10A is an SEM photomicrograph of graphene.
Figure 10B:
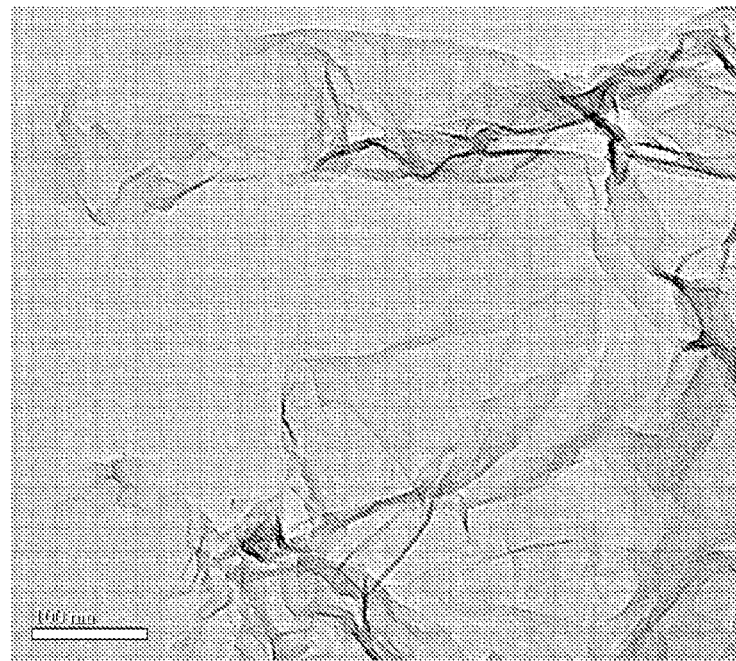
FIG. 10B is a TEM image of graphene.
Figure 11:
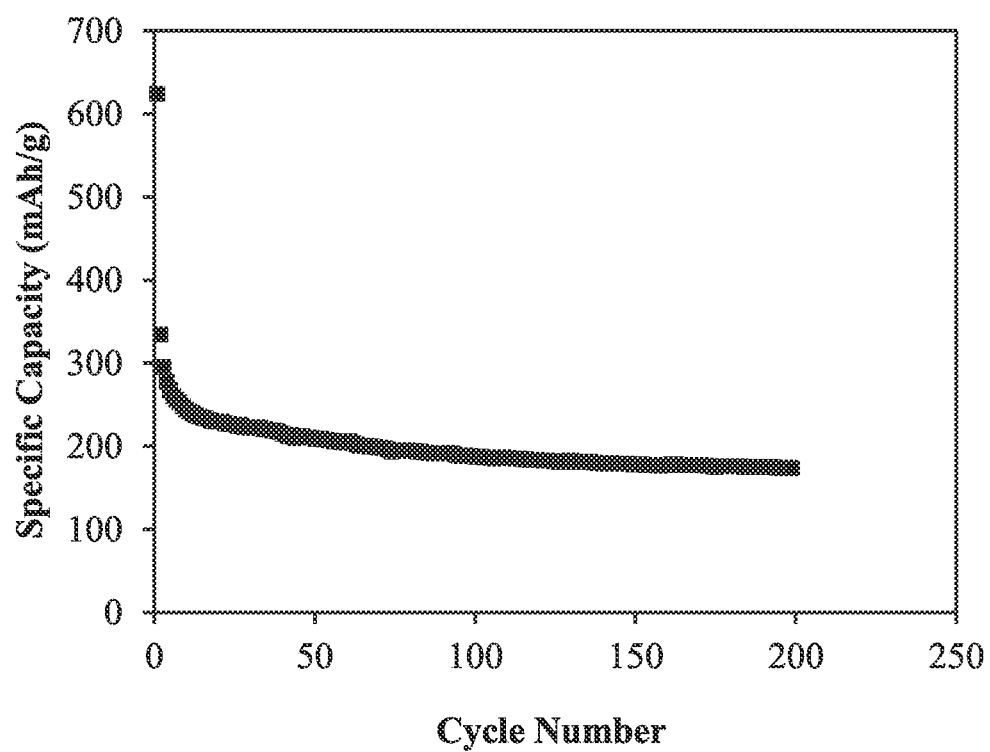
FIG. 11 graphically illustrates specific capacity retention of graphene sheets as the anode in LIB.

EIS measurements were conducted to investigate the electrochemical behaviors of Si and graphene-encapsulated carbonized PANI-coated Si composite electrodes, and the Nyquist plots are shown in FIG. 8. A semicircle shape in the high frequency region and a straight line in the low frequency region can be observed. FIG. 8A shows the Nyquist plots of the Si nanoparticle electrodes before and after 100 cycles at 3 A/g. The semicircle became larger, suggesting that the charge transfer resistance increased, probably resulting from the pulverization of the Si nanoparticles and the thick SEI layer. In the graphene-encapsulated carbonized PANI-coated Si composites (FIG. 8B), the semicircle became only slightly wider, a very small change, suggesting that the pulverization and agglomeration of the Si nanoparticles during cycling was effectively suppressed because the Si nanoparticles were wrapped in the carbon coating and graphene sheets. Thus, a stable SEI layer, fast electron transfer, and facile Li$^+$ diffusion path have been achieved, leading to the excellent cycling performance.

Example

Si nanoparticles sized with diameters <50 nm were first treated with 10% HF to remove the surface oxides and then stored in an Ar-filled glove. HF-treated Si, p-phenylenediamine, and $H_2SO_4$ were dispersed in $N_2$-purged DI water to yield a dispersion. The dispersion was constantly stirred and kept in an ice bath. A solution containing $NaNO_2$ was added dropwise into the above dispersion. The solution was then heated at 60° C. for 2 h. The resulting aniline-functionalized Si was filtrated with a 0.025 μm filter membrane, washed with $N_2$-purged water and ethanol, and vacuum dried. The aniline-functionalized Si, the aniline monomer, and the HCl were dispersed in DI water. A solution of the oxidant, $(NH_4)_2S_2O_8$ (APS), was rapidly added into the above dispersion. The mixture was stirred for 8 h, and the precipitated product was filtered, washed, and vacuum dried. A GO aqueous dispersion and a PANI-coated Si nanoparticle dispersion were mixed, sonicated, and stirred for 4 h. The mixture was filtrated and freeze dried. Finally, the graphene-encapsulated carbon-coated Si composites were yielded by carbonization at 900° C. for 2 h at a heating rate of 2° C./min.

Raman spectra were taken with laser excitation at 785 nm. FTIR spectra were measured and TGA curves were obtained. The morphology was characterized by a transmission electron microscope (TEM) and by scanning electron microscopy (SEM). The $N_2$ adsorption/desorption isotherms were measured at 77 K. The Brunauer-Emmett-Teller (BET) specific surface area was calculated using adsorption data at the relative pressure range of 0.05-0.3. The total pore volumes were estimated from the amount adsorbed at a relative pressure ($P/P_o$) of 0.99. The BJH pore size distribution was calculated based on the desorption branch of the isotherm.

The electrochemical tests were measured in a 2016R-type coin cell. Lithium foil was used as the counter electrode. The working electrode was fabricated by pasting the slurry containing 70% active materials, 15% SuperP, and 15% poly(acrylic acid) in water onto a Cu foil using the doctor-blade method. The electrode was then dried in a vacuum oven at 60° C. for 12 h and then assembled into the coin cell in an Ar-filled glove box. The mass loading of the active material on each electrode was about 0.4-0.5 mg/cm$^2$. The electrolyte used was 1.2 M $LiPF_6$ in EC/EMC (3:7 v:v) and a polypropylene membrane was used as the separator. The Galvanostatic charge/discharge tests were performed on a battery test station. Cyclic voltammetry (CV) and electrochemical impedance spectroscopy (EIS) were performed.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A method for producing a graphene-composite material, comprising: a) providing a plurality of silicon nanoparticles; b) removing any oxide layer from each respective silicon nanoparticle to yield clean silicon nanoparticles; c) forming a polyaniline layer over each respective clean silicon nanoparticle to yield a plurality of polyaniline functionalized particles; d) binding a graphene oxide sheet to the polyaniline layer of each respective polyaniline functionalized particle to yield a plurality of green particles; and e) carbonizing the polyaniline layer of each respective green particle to yield a plurality of composite particles; wherein each respective composite particle has a graphene outer layer substantially encapsulating a silicon inner core; and wherein the respective silicon nanoparticles have diameters of less than about 100 nanometers.

2. The method of claim 1 wherein in b), the oxide layer is removed by washing the silicon nanoparticles with an HF solution; and wherein in b) the resulting clean silicon nanoparticles have residual oxide layers less than 5 nm thick.

3. The method of claim 1 wherein in c), a polyaniline layer is formed over each respective clean silicon nanoparticle through surface-initiated polymerization of aniline on the surface of aniline-functionalized Si nanoparticles.

4. The method of claim 1 and further comprising: f) forming an electrode member from a quantity of composite particles; g) incorporating the electrode member in a lithium-ion battery.

5. The method of claim 4, wherein the electrode member is an anode.

6. A composite particle, comprising:
a silicon nanoparticle; and
a graphene sheet bound to the silicon nanoparticles and substantially encapsulating the same; and
a polyaniline functionalization layer between the silicon nanoparticles and the graphene sheet.

7. A composite particle, comprising:
a silicon nanoparticle; and
a graphene sheet bound to the silicon nanoparticles and substantially encapsulating the same;
wherein the polyaniline functionalization layer is partially carbonized.

8. A method for preparing a carbon-silicon composite material, comprising: a) identifying a plurality of silicon particles, wherein each respective particle is substantially free of surface oxidation; b) functionalizing the respective silicon particles to yield a plurality of functionalized particles; c) wrapping each respective functionalized particle with a graphene oxide sheet to yield a plurality of green particles; and d) calcining each respective green particle to yield a plurality of composite particles; wherein each respective composite particle has a silicon inner core and a carbonaceous outer layer.

9. The method of claim 8 wherein the silicon particles have diameters of less than 100 nm.

10. The method of claim 8, wherein step b) includes functionalizing each respective silicon particle with a polyaniline layer.

11. The method of claim 10 wherein in b), a polyaniline layer is formed over each respective silicon particle through surface-initiated polymerization of aniline on the surface of aniline-functionalized Si nanoparticles.

12. The method of claim 8 and further comprising: e) before a), identifying a plurality of at least partially oxide-coated silicon particles; f) after e) and before a), removing oxide coatings from each respective at least partially oxidized silicon particle to yield a plurality of polished silicon particles.

13. The method of claim 12 wherein in f), oxide coatings are removed by washing the partially oxidized silicon particles with an HF solution and wherein each respective polished silicon particle has an oxide layer between o nm thick and 5 nm thick.

14. The method of claim 12 and further comprising: g) forming an electrode member from a quantity of composite particles; h) incorporating the electrode member in a lithium-ion battery.

15. The method of claim 14, wherein the electrode member is an anode.

* * * * *